United States Patent [19]
Lillich

[11] Patent Number: 5,613,101
[45] Date of Patent: Mar. 18, 1997

[54] METHOD AND APPARATUS FOR DETERMINING AT EXECUTION COMPATIBILITY AMONG CLIENT AND PROVIDER COMPONENTS WHERE PROVIDER VERSION LINKED WITH CLIENT MAY DIFFER FROM PROVIDER VERSION AVAILABLE AT EXECUTION

[75] Inventor: Alan W. Lillich, Los Gatos, Calif.

[73] Assignee: Apple Computer, Inc., Cupertino, Calif.

[21] Appl. No.: 483,621

[22] Filed: Jun. 7, 1995

Related U.S. Application Data

[63] Continuation of Ser. No. 58,345, May 5, 1993, abandoned.
[51] Int. Cl.$^6$ .................................................. G06F 11/00
[52] U.S. Cl. ................................................................ 395/500
[58] Field of Search ...................................... 395/500, 700

[56] References Cited

U.S. PATENT DOCUMENTS

| | | | |
|---|---|---|---|
| 4,558,413 | 12/1985 | Schmidt et al. | 395/600 |
| 4,788,637 | 11/1988 | Tamaru | 395/200.1 |

FOREIGN PATENT DOCUMENTS

| | | |
|---|---|---|
| 0479660 | 9/1991 | European Pat. Off. . |
| 0498130 | 12/1991 | European Pat. Off. . |

OTHER PUBLICATIONS

Letwin, G. Inside OS/2. Redmond, Washington, Microsoft Press, 1988. pp. 114–116.

Kenah, L. et al. VAX/VMS Internals and Data Structures Version 4.4. Maynard, Massachusetts, Digital Equipment Corporation, 1988. pp. 576–578.

IBM AIX Version 3 for RISC System/6000™ XL C User's Guide. White Plains, N.Y., International Business Machines Corporation, 1990, pp. 7–9; pp. 11–39.

Apple Computer, Inc. Inside Macintosh, vol. VI. Reading, Massachusetts, Addison–Wesley Publishing COmpany, Inc. 1991. pp. 9–23, 9–24.

Bradbeer, R., Series Editor. Atari–ST Series the Concise Atari ST 68000 Programmer's Reference Guide. Barnet, Herts. England, Glentop Publishers Ltd., 1986. pp. 2–21–2–27.

"a.out File Format," RS6000 Infoexplorer CD Rom. White Plains, N.Y., IBM Corporation, 1991. pp. 1–2.

(List continued on next page.)

*Primary Examiner*—Ken S. Kim
*Attorney, Agent, or Firm*—Helene Plotka Workman

[57] ABSTRACT

The invention is a method and apparatus for verifying compatibility between components of a system which share a client-provider relationship. Briefly, according to the invention, a current version of a provider and a compatibility range are defined for each of a version of a client and a version of a provider. A version of a provider specifies an oldest implementation provider and an oldest definition provider. When a client is linked with a particular version of a provider it stores an identification for that provider, a current indicator for that version of the provider, called a definition provider, and the oldest implementation provider. At runtime, compatibility checks are performed between a client and available versions of the provider(s), called implementation providers, with which it has been linked. For each available version of each type of provider compatibility exists with the client in three situations. First, if the definition provider and the implementation provider are the same version of that provider, then the client and provider are compatible. Second, if the definition provider, i.e. the version of the provider linked with the client, is newer than the implementation provider, then if the version of the implementation provider is no older than the oldest implementation provider specified in the client, the two are compatible, otherwise they are incompatible. Third, if the definition provider is older than the implementation provider, then if the definition provider is no older than the oldest definition provider specified in the implementation provider, then the two are compatible.

19 Claims, 13 Drawing Sheets

OTHER PUBLICATIONS

"Optional Auxiliary Header for the a.out File, " RS6000 Infoexplorewr CD Rom. White Plains, N.Y., IBM Corporation, 1991, pp. 1–2.

"Section Headers for the a.out File, " RS6000 Infoexplorer CD Rom. White Plains, N.Y., IBM Corporation, 1991, pp. 1–2.

"Raw Data Sections for the a.out File, " RS6000 Infoexplorer CD Rom. White Plains, N.Y., IBM Corporation, 1991. p. 1.

"Special Data Sections for the a.out File, " RS6000 Infoexplorer CD Rom. White Plains, N.Y., IBM COrporation, 1991. pp. 1–6.

"Relocation Information for the a.out File, " RS6000 Infoexplorer CD Rom. White Plains, N.Y., IBM Corporation, 1991, pp. 1–2.

"xcoff.h, " RS6000 Infoexplorer CD Rom. White Plains, N.Y., IBM Corporation, 1989, pp. 1–3.

"filehdr.h, " RS6000 Infoexplorer CD Rom. White Plains, N.Y., IBM Corportion, 1989, pp. 1–3.

"reloc.h, " RS6000 Infoexplorer CD Rom. White Plains, N.Y., IBM Corporation, 1989. pp. 1–3.

"scnhdr.h, " RS6000 Infoexplorer CD Rom, White Plains, N.Y., IBM Corporation, 1989. pp. 1–2.

"loader.h, " RS6000 Infoexplorer CD Rom, White Plains, N.Y., IBM COrporation, 1989. pp. 1–2.

"ld Command, " RS6000 Infoexplorer CD Rom, White Plains, N.Y., IBM Corporation, 1991. pp. 1–12.

METHOD AND APPARATUS FOR DETERMINING AT EXECUTION COMPATIBILITY AMONG CLIENT AND PROVIDER COMPONENTS WHERE PROVIDER VERSION LINKED WITH CLIENT MAY DIFFER FROM PROVIDER VERSION AVAILABLE AT EXECUTION

This is a continuation of application Ser. No. 08/058,345 filed May 5, 1993 now abandoned.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

This invention relates generally to compatibility between various components of a computer system and, more specifically, to checking whether interoperating components are compatible within a specified compatibility range.

BACKGROUND OF THE INVENTION

In a computer system, compatibility between various components, both hardware and software, of the system may be important. A new component or an upgrade of an existing component may be incompatible with other components in a system, rendering the entire system inaccurate or inoperative. Thus, it is important to have a mechanism for verifying compatibility between components of a system.

Compatibility plays an important role in a client-provider relationship wherein a provider supplies services to a client because it is important that the provider be able to satisfy expectations of the client. A client-provider relationship may exist between two computer software programs, two computer hardware components or between a software program and a hardware component. An example of a client-provider relationship is a relationship between a shared library (provider), that is a collection of routines which can be accessed by other computer programs, and a computer program (client) which accesses the routines in the library.

Typically, as computer programs are modified, upgraded or otherwise improved, new versions of the computer programs are released. To differentiate between different versions of a computer program, a version number is typically assigned to each release of the computer program. Usually, version numbers are assigned such that a newer version of a computer program has a higher version number than an earlier version of that computer program. For example, if a particular version of a computer program has a version number of 2, then a subsequent version of that computer program may have a version number greater than 2.

Computer programs are typically written originally in source code in a computer language such as C or Pascal, or in an assembly language. To prepare the program for execution on a computer system, a compiler (or assembler) converts one or more source code modules into an object code file. A compiler (or assembler) is specific to the language used and the computer system on which it will be executed. A linker routine, which is either a separate program or is part of the compiler, combines the object code files into a single output file, known as an "executable" object code file. One or more executables are then loaded together into memory by a loader program, and control is transferred to a start address to initiate program execution.

Typically, in a client-provider relationship between two software programs, it is important for compatibility to exist between the version of a provider such as a shared library linked to a client and the version of the provider (shared library) used during execution of the client. During linking in a client/provider relationship, imports (unresolved external symbols in the client) are resolved to exports from the provider (symbols in the provider that are visible to the client). At link time, the provider supplies definitions of symbols (the API) but not the actual implementation of routines and variables (the code). Thus, the version of the provider used at link time is called a "definition version".

When a client is executed, the imports in the client are connected to the associated exports in the provider. The connection could be in hardware such as a wire between the two, or in software such as an operating system, a code fragment manager, or other shared library or code manager. At runtime, the provider supplies actual implementation of routines and variables, i.e. code. Since the API is supplied at link time and the code is supplied at runtime, it is important that the definitions supplied by a provider at link time are compatible with the implementation of the provider used at runtime.

In the VMS operating system by Digital Equipment Corp., Inc., typically a version of a provider is designed to be compatible with previous versions, i.e. a version of a provider is backwards compatible. VMS is a trademark of Digital Equipment Corporation. Thus, a client can be executed using a version of the provider which is newer than the version with which it was built. However, a version of the provider which is older than the version used to build the client may not support features available in newer versions of the provider. Therefore, a client can not be executed using a version of a provider which is older than the version used to build the client, because the older provider may not be compatible with the newer version.

In VMS, as shown in "VAX/VMS Internals and Data Structures", version 4.4, Lawrence J. Kenah, Ruth E. Goldberg, Simon F. Bate (Digital Press: 1988), section 21.1.1.2, a provider typically has a revision number comprising a major number component and a minor component, usually denoted as "major.minor" or "major/minor". VAX is a trademark of Digital Equipment Corporation. When a new revision of a provider contains substantial changes from a prior instance of the provider, then the major number is incremented. However, if the changes are only minor changes, then usually only the minor number is incremented. At link time, the revision number of the provider supplying the definitions is stored in the executable object code. At execution time, the major number of the stored revision number in the client is compared to the major number in the revision code of the provider being accessed to implement the client. If the major number of the revision of the implementation provider is less than the major number of the revision number stored in the client's executable object code, then the client and provider are considered incompatible, regardless of whether the two are in fact incompatible.

For example, if the client is linked with a provider having a revision number of 7.1, then it would be considered incompatible with a provider having a major number less than 7 such as 6.5, 5.0, etc. . . . , but it would be considered compatible with a provider having a major number greater than or equal to 7 such as 7.5, 8.0, etc. . . . . .

The backwards compatibility scheme in VMS presents several problems. First, it discourages a developer of a provider from assigning to a current version of the provider being developed a major number higher than that assigned to the prior version, even though that version may be substantially different from prior versions of the provider.

Second, in this versioning scheme it is usually desirable to use the newest version of an operating system to utilize features or enhancements unavailable in previous versions. However, the newest version of an operating system is usually compatible with the newest version of a shared library and not compatible with older versions of the shared library. Therefore, clients which were built using newer versions of the shared library on a developer's system can not be executed using the older version of the shared library on an end user's system. Thus, developers are encouraged to maintain old system installations in order to link with the oldest available version of a provider, thereby increasing the number of versions of the provider with which it is compatible. Moreover, older versions of the shared library might be retained just to execute clients which were built with older versions of the shared library. These older versions occupy memory space which might otherwise be available for other purposes.

For example, consider a situation where two versions of a provider are available at link time, an earlier version having a version number of 2.0 and a later version having a version number of 4.2. The 4.2 version has some features which are not present in the 2.0 version and which would be advantageous to the client to use. In order to utilize the advantageous features, it is preferable to link with the 4.2 version. However, since it is unknown which version of a provider will be available at runtime, it is also preferable to link with the version with the most likelihood of being compatible with a version available at runtime. In this case, since version 2.0 is compatible with versions greater than or equal to 2.0 and 4.2 is compatible with versions greater than or equal to 4.2, version 2.0 is more likely to be compatible with an available version of a provider than the 4.2 version. Thus, in this case, a client has a choice between either utilizing the advantageous features of the 4.2 version or increasing likelihood of compatibility with 2.0. By choosing to increase the likelihood of compatibility at runtime and thus, linking with the earliest version of a provider available, a client foregoes the advantageous features of later versions of that provider which are also available and which, may, in fact, be compatible with those earlier versions.

In other operating systems such as OS/2, as discussed in "Inside OS/2", Gordon Letwin, (Microsoft Press: 1988), section 7.11.3, and Windows, version numbers are not used for providers such as shared libraries. OS/2 is a registered trademark of Internation Business Machines Corporation. In these systems, older versions are designed to be compatible with newer versions and newer versions are designed to be compatible with older versions. In other words, a version of a provider is designed to be backwards and upwards compatible with other versions of that provider. This places a burden on developers of the shared library to maintain compatibility even when the changes are extensive and even when the older versions may only be used infrequently.

SUMMARY OF THE INVENTION

The invention is a method and apparatus for controlling and verifying compatibility between modular components of a computer system wherein such components share a client-provider relationship and a version of a provider used to build the system may be different than a version of the provider used to execute or run the system. Briefly, according to the invention, a provider indicator, a current indicator of a provider and a compatibility range are defined for each of a client and a provider. A provider indicator identifies a particular type of provider. A current indicator of a provider specifies that version of the provider. When a client is linked with a version of a provider the current indicator of that provider is stored in the executable client produced, thereby identifying the version of the provider, herein called a "definition provider", used to build the client.

The compatibility range for the client identifies the range of versions of the provider which can be used to execute the client, i.e. which have an implementation which is compatible with the definitions supplied by the definition provider. Preferably, the compatibility range for the client specifies the oldest version of the provider which can be used to execute the client. The compatibility range for the provider identifies the range of versions of the provider which could be used to build a client capable of operating with the current version of the provider. Preferably, the compatibility range for the provider specifies the oldest version of the provider which could have been used to build a compatible client. Preferably, the versions within each of the two compatibility ranges are older than or equal in age to the current version.

The invention also includes a connector for connecting at runtime the client and the provider which will be used to execute the client, herein called an "implementation provider" to determine compatibility between the client and the implementation provider. Compatibility checks are performed between a client and available versions of the provider(s), implementation providers, with which it has been linked. For each available version of each type of provider compatibility with a client exists in three situations. First, if the definition provider specified in the client and the implementation provider are the same version of that provider, then the client and provider are compatible. Second, if the definition provider specified in the client is newer than the implementation provider, then if the version of the implementation provider is no older than the oldest implementation provider specified in the client, the two are compatible, otherwise they are incompatible. Third, if the definition provider specified in the client is older than the implementation provider, then if the definition provider specified in the client is no older than the oldest definition provider specified in the implementation provider, then the two are compatible.

The invention can be used in systems having multiple clients and providers. In that case, for each client a list of providers is maintained. For each provider in the list, a current version and a compatibility range are defined. At runtime, the list can be searched to find a compatible provider, if any exists. Preferably, if more than one compatible provider is found, the "best" is chosen. For example, the best provider may be the most current version of the provider which is compatible or it may be the version of the provider which is closest to the version of the definition provider.

By defining compatibility ranges for a client and for a provider, the invention provides several advantages. First, the invention permits a client to run with versions of a provider which are older than the definition version of the provider used to build the client. Thus, a client does not have to build only with the oldest version of the provider that it will ever be used with. This provides a developer of a client with flexibility in determining the version of the provider with which to build the client. Additionally since a client may be linked with a version which is newer than the oldest version of the provider, the client may be able to utilize features or enhancements, in the newer provider which may not exist in the oldest provider. Features or enhancements may be explicitly different from previous versions, e.g. the feature was not available in any form in the previous versions or a new mechanism is used to utilize the feature, or they may be implicitly different, e.g. the performance of an existing feature is enhanced in the newer version. Preferably, a client verifies the availability of explicit features and enhancements.

Second, the invention permits a client to be executed with a provider which is newer than the client, i.e. a provider which is newer than the version of the provider which was used to build the client. Thus, developers of a provider can freely change version numbers of the provider and not affect the compatibility of the client and the provider unless the changes to the provider render it incompatible with older versions of the client. In that case, the compatibility range of the provider changes to reflect the changes in compatibility.

BRIEF DESCRIPTION OF THE DRAWINGS

The above and further advantages of the invention may be better understood by referring to the following description in conjunction with the accompanying drawings, in which.

DETAILED DESCRIPTION OF THE DRAWINGS

Figure 1:
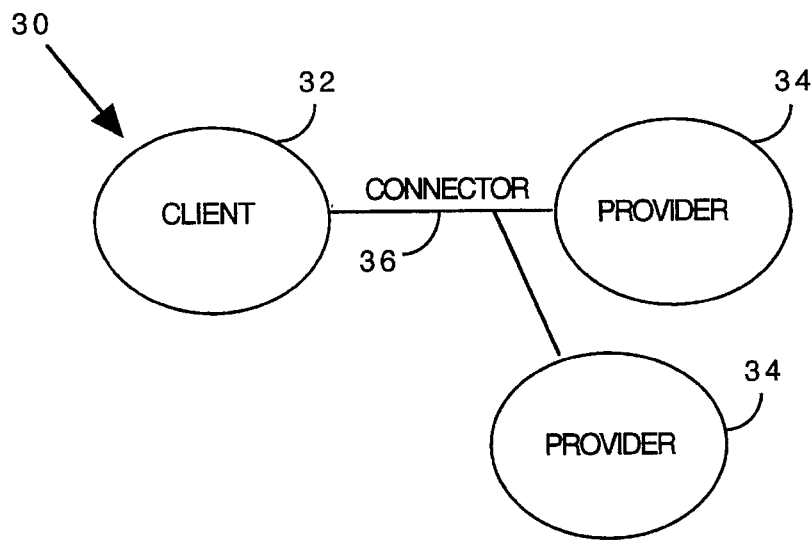
FIG. 1 is a symbolic, simplified block diagram of a system which may incorporate the invention.

Numeral 30 in FIG. 1 generally indicates a system incorporating the invention. System 30 may be hardware, software, or a combination thereof, and includes a client 32 and a provider 34 connected by a connector 36 such that information from the client and provider can be compared.

Figure 2:
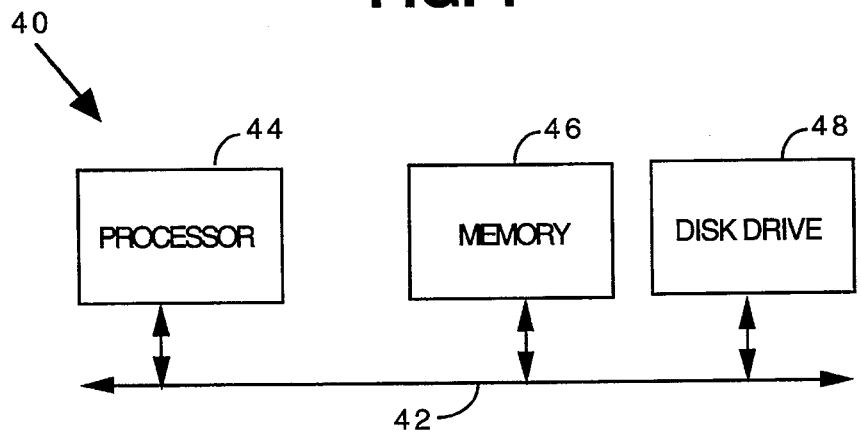
FIG. 2 is a symbolic, simplified block diagram of a computer system which may incorporate the invention.

FIG. 2 illustrates a computer system 40, comprised of hardware and software, which may be used to implement the invention. Computer system 40 comprises a bus 42 interconnecting a processor 44 such as a central processing unit ("CPU"), a memory 46 and a disk drive 48. Many types of computer systems may be used, but in the present embodiment, computer software is usually stored on the disk drive 48 and brought into memory 46 over bus 42 by the processor 44.

Figure 3:
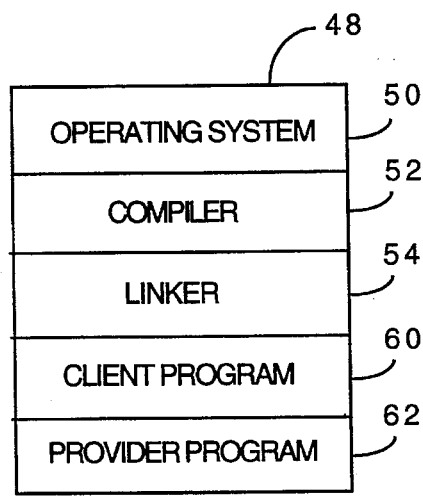
FIG. 3 illustrates contents of a disk drive of the computer system of FIG. 2.

As shown in FIG. 3, prior to linking a client with a provider, this computer software typically includes an operating system 50 such as, for example, Macintosh System 7 or AIX, a compiler 52 such as an IBM xlc or xlC compiler and a linker 54 such as IBM ld linker. Macintosh System 7 and AIX are both commercially available. Background information on the Macintosh System 7 operating system can be found in "Inside Macintosh", Vol. VI, Addison-Wesley Publishing Co., Inc., 1991, and background information on the AIX operating system can be found in "Calls and Subroutines, AIX Version 3 for RISC System/6000", Vols. I–VI, IBM, 1990, 1991. The IBM xlc compiler is described in "XL C User's Guide, AIX Version 3 for RISC System/6000", chapters 2–4, IBM Corporation, 1990, the disclosure of which is hereby incorporated by reference. AIX and RISC System/6000 are trademarks of International Business Machines Corporation. The ld linker is discussed in an article entitled "ld Command" published in IBM, "R6000 InfoExplorer", (CD-ROM 1991), the disclosure of which is herein incorporated by reference.

Compiler 52 and linker 54 may also be part of the same computer program, rather than separate programs. Moreover, the compiler 52 and the linker 54 may be on a different computer system 40 than the client 32 and providers 34.

The computer software also includes one or more client programs 60 and one or more provider programs 62. For example, a client program 60 may be an application program that accesses routines in a shared library (a provider 62). This software may also be located in memory 46. A client program 60 is typically in object code format produced by passing source code for the client through a compiler which generates object code as its output. A provider program 62 may be in executable object code format or it may be a definition file which is specially built to provide definitions to use when linking. For example, object code modules of a shared library may be linked together to form a provider program 62 which is executable object code that is then linked with client program object code 60 to form executable object code 64 of the client program.

In addition, the computer software may include source code (not shown) for the client programs 60 and the provider programs 62. The source code for the client is converted into object code 60 by a compiler. The source code for a provider, if it is not a definition file, is converted into executable object code by a combination of a compiler 52 and linker 54.

There are numerous formats for executable object code files. One format for executable object code files is known as XCOFF. XCOFF is described in the following articles published in IBM, "R6000 Explorer" (CD-ROM 1991):

"a.out File Format",

"Optional Auxiliary Header for the a.out File",

"Section Headers for the a.out File",

"Raw Data Sections for the a.out File",

"Special Data Sections for the a.out File",

"Relocation Information for the a.out File",

"xcoff.h",

"filehdr.h",

"scnhdr.h",

"loader.h", all herein incorporated by reference.

Another format for executable object code files is used in the GEM disk operating system for Atari ST Computers. See K. Peel, "The Concise Atari ST 68000 Programmer's Reference Guide", Glentop Publishers, 1986, particularly pp. 2–21 through 2–24. The entire Peel guide is herein incorporated by reference.

Another format for executable object code files is called PEF. PEF is described in a copending and commonly assigned patent application entitled "Load Time Relocation Engine" filed on Mar. 23, 1993, the disclosure of which is herein incorporated by reference.

Figure 4A:
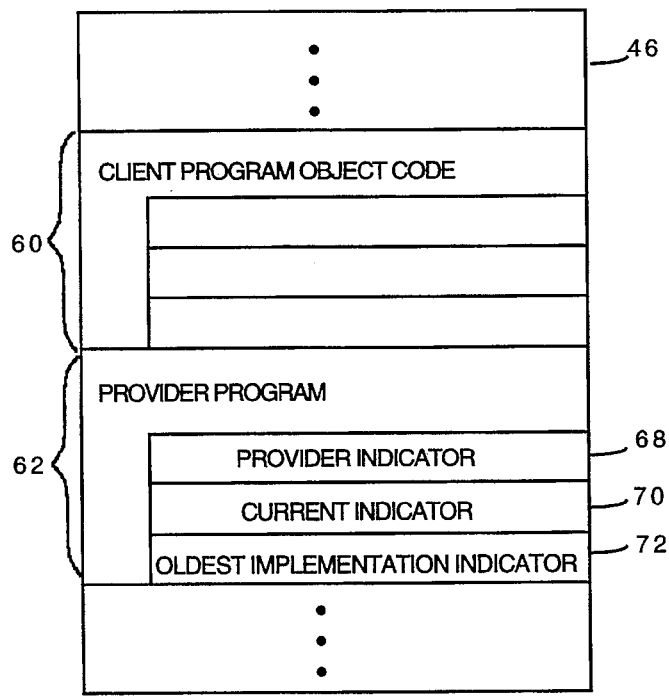
FIGS. 4A and 4B illustrate contents at the start and end, respectively, of link time of a memory of the computer system of FIG. 2.
Figure 4B:
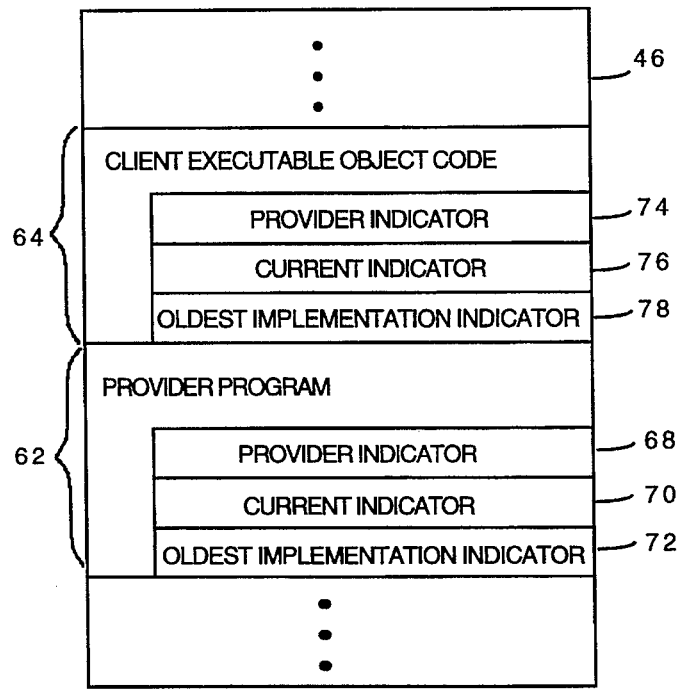

FIGS. 4A and 4B illustrate the contents of memory 46 before and after, respectively, a client program 60 is linked with one or more providers 62. As shown in FIG. 4A, before linking, memory 46 contains possibly in addition to the operating system, compiler and linker, object code 60 for the client program and object code 62, perhaps executable object code, for each provider being linked with the client. During linking, a linker routine uses the object codes 60 and 62 as input and produces executable object code 64 (FIG. 4B) as output.

The object code 62 of each provider specifies at least a provider indicator 68, a current indicator 70 for identifying a version of that provider, also known as a "definition provider", and an oldest implementation indicator ("OII") 72 for identifying the oldest version of the provider with which a client can operate after being linked with that provider. In other words, OII 72 indicates the oldest version of the provider having an implementation which is compatible with the definitions supplied by the version of the provider being used at link time.

The provider indicator 68 uniquely identifies or distinguishes a provider from other providers. For example, a provider indicator 68 may be a null-terminated character string, an integer or an alphanumeric value.

Versions may be specified or otherwise denoted in any form which allows comparisons to be made based on some type of sorting criteria. For example, versions may be specified by character strings, numeric values or alphanumeric values. A possible format for the version information which is used in Macintosh operating systems is described in "Inside Macintosh", Vol. VI, pages 9–23 and 9–24, Addison-Wesley Publishing Co., Inc., 1991, the disclosure of which is herein incorporated by reference. As described therein, a version is indicated in a four-byte numeric value.

The provider indicator 68, current indicator 70 and OII 72 are preferably stored in a header which contains overall information about the provider. For example, in PEF format, executable object code, otherwise called a container, includes a container header which among other information contains a provider indicator 68, a current indicator 70 and an OII 72. For more information on a header in XCOFF see articles entitled "Optional Auxiliary Header for the a.out File" and "filehdr.h".

During linking, the values specified by the provider indicator 68, the current indicator 70 and OII 72 are copied and stored in, or otherwise incorporated into, the executable object code 64, as shown in FIG. 4B. The value of the provider indicator 68 is stored in provider indicator 74. The value of current indicator 70 is stored in current indicator 76 and the value of OII 72 is stored in OII 78.

In PEF format the provider indicator 74, the current indicator 76 and the OII 78 are preferably stored in an import container id table within the executable object code 64 of the client. In XCOFF format those values are preferably stored in an appropriately modified import file ID table.

A client can change the version indicated by the OII 78 as long as it verifies compatibility with versions which are no older than the version it specifies. For example, a version 3.0 of a provider may have an OII which specifies version 2.0. Version 2.0 is essentially version 1.0 with additional explicit features. A client which does not use those additional explicit features may be compatible with version 1.0 as well. In that case, the client which is linked with version 3 can change the OII 78 to indicate version 1.0 rather than 2.0. When a client changes the value of the OII 78, the value of the current indicator 76 is unchanged and still indicates the version of the provider with which the client was built.

Figure 5:
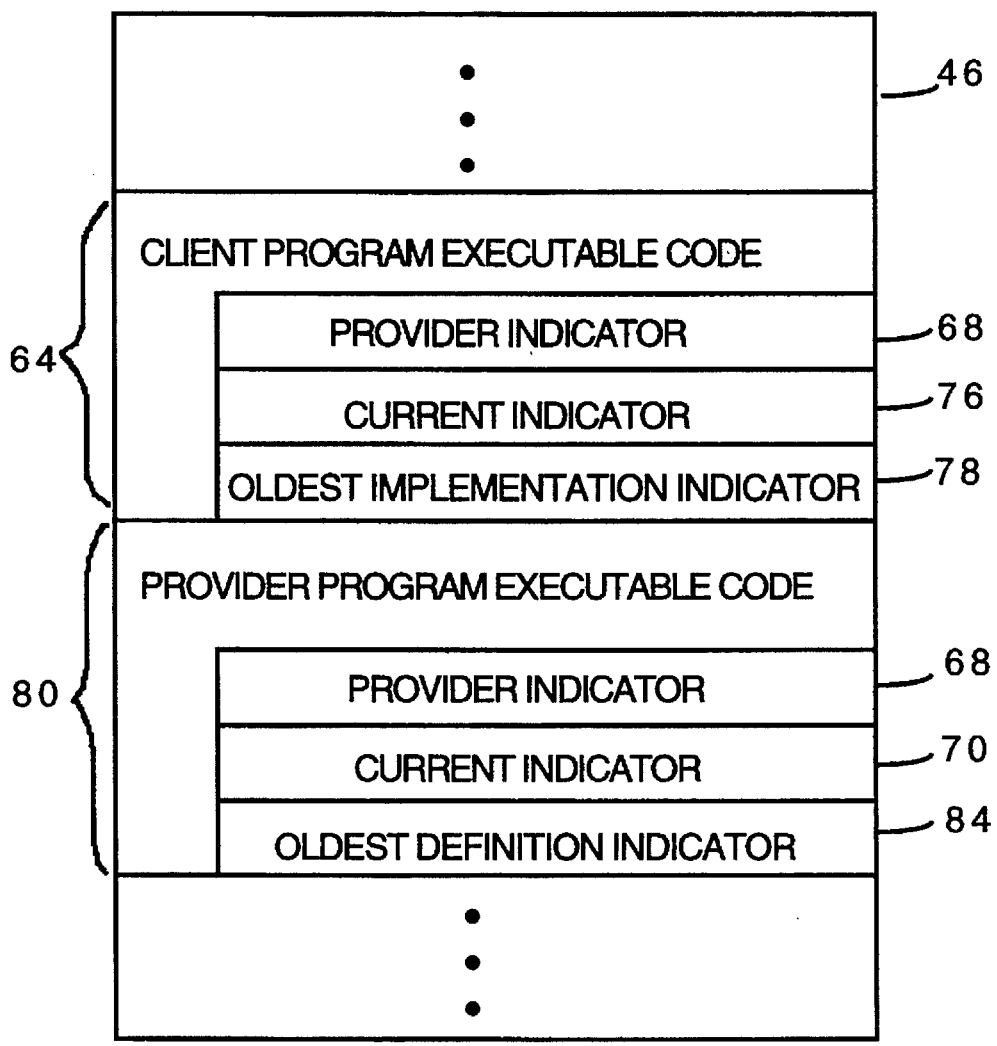
FIG. 5 depicts contents at execution time of a memory of the computer system of FIG. 2.

FIG. 5 illustrates the contents of memory 46 when a client program 60 is executed. At that time, memory 46 contains, in addition to an operating system, executable object code 64 for the client 32 and executable object code 80 for each provider 34. The executable object code 80 for each provider, also known as an "implementation provider" (a provider may be both a definition provider and an implementation provider), specifies, preferably in a header, at least a provider indicator 68, a current indicator 70 and an oldest definition indicator 84 ("ODI") for identifying the oldest version of the provider having definitions which are compatible with the implementations provided by the version of the provider specified by current indicator 70.

Optionally, when definitions and implementations of a provider are packaged into a single program, ODI 84 may be defined in the object code 62 (FIGS. 4A and 4B) of the provider. In that case, ODI 84 identifies the oldest version of the provider which has definitions which are compatible with the version of the provider specified by current indicator 70.

Figure 6:
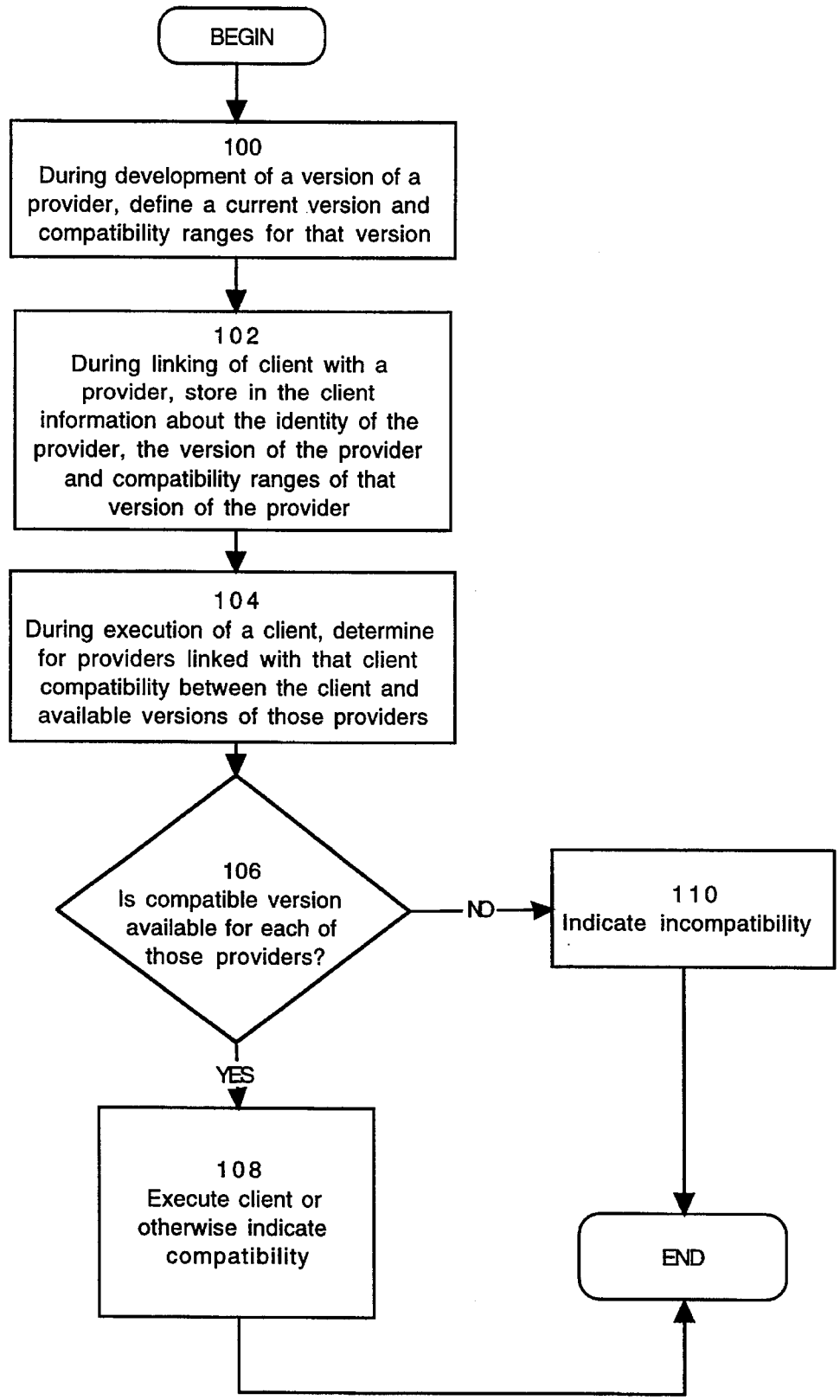
FIG. 6 is a flow chart depicting in general the steps of the invention.

FIG. 6 is a flowchart generally illustrating broad steps of the invention. At block 100, when a version of a provider program is developed, a current version and compatibility ranges are defined for that version of the provider. At block 102, when a client program is linked with a provider, information about the version and compatibility ranges of that provider is stored in the executable code of the client produced by the linking process. At block 104, when a client is executed, compatibility is determined between that client and available versions of implementation providers. Preferably, when more than one compatible version of an implementation provider is available, the "best" of those compatible versions is used to execute the client. Criteria and steps used to determine the "best" compatible version are discussed later in conjunction with FIGS. 14 and 15.

At decision block 106, if there is a compatible version available for the provider(s), then at block 108 the client is executed or compatibility is otherwise indicated. However, if at block 106, there is no compatible version of a provider, then incompatibility is indicated at block 110 and, depending on the severity of the incompatibility, the client may or may not be executed. In some situations, even though an incompatibility exists, a client may be able to execute at a sufficient, although not maximum, level. There are numerous ways to indicate this incompatibility and the advantages of the invention do not depend on the manner used.

Figure 7:
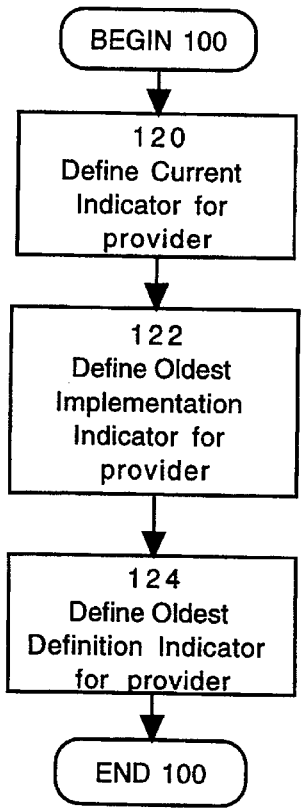
FIG. 7 is a more detailed flow chart depicting the steps of block 100 of FIG. 6.

FIG. 7 is a flowchart detailing a preferable embodiment of steps of block 100 of FIG. 6. At block 120 a current indicator 70 (FIGS. 4A, 4B and 5) is defined. Preferably, a current indicator 70 of a provider is defined such that the value is greater than the value of current indicators of prior versions of that provider. At block 122 an oldest implementation indicator (OII 72 of FIG. 4A) is defined and at block 124 an oldest definition indicator (ODI 84 of FIG. 5) is defined. Blocks 120, 122 and 124 may be performed in any order. Preferably, OII 72 and ODI 84 are each less than or equal to the current indicator 70.

Figure 8:
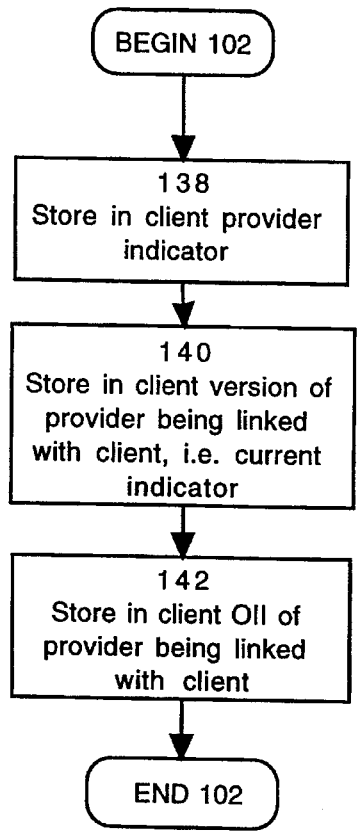
FIG. 8 is a more detailed flow chart depicting the steps of block 102 of FIG. 6.

FIG. 8 is a flowchart detailing a preferable embodiment of steps of block 102 of FIG. 6. At blocks 138 and 140, values specified by the provider indicator 68 and the current indicator 70, respectively, of the provider being linked with the client are copied and stored, or otherwise transferred, to the client, i.e. placed in the executable object code 64 of the client (FIG. 5). At block 142, the OII 72 from the provider being linked with the client is copied and stored, or otherwise transferred, to the client. Blocks 138, 140 and 142 may be performed in any order.

Figure 9:
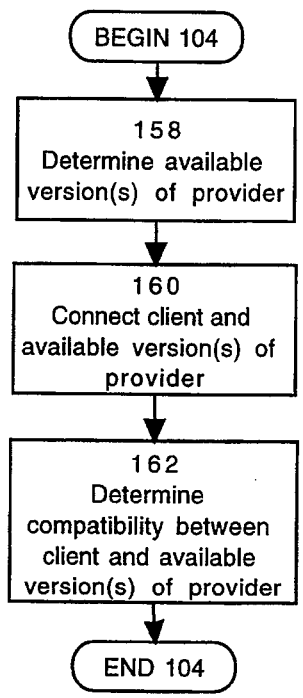
FIG. 9 is a more detailed flow chart depicting the steps of block 104 of FIG. 6.

FIG. 9 is a flowchart detailing a preferable embodiment of steps of block 104 of FIG. 6. At block 158 available providers are determined. At block 160 a connector 36 (FIG. 1) connects a client and an implementation version of a provider. The connector 36 may be software such as an operating system or other code fragment manager which provides communication between the client and the provider to perform comparisons of values supplied by each. Alternatively, connector 36 may be hardware such as a wire which permits an exchange of signals between the client and the provider and permits comparisons of those signals.

Figure 10:
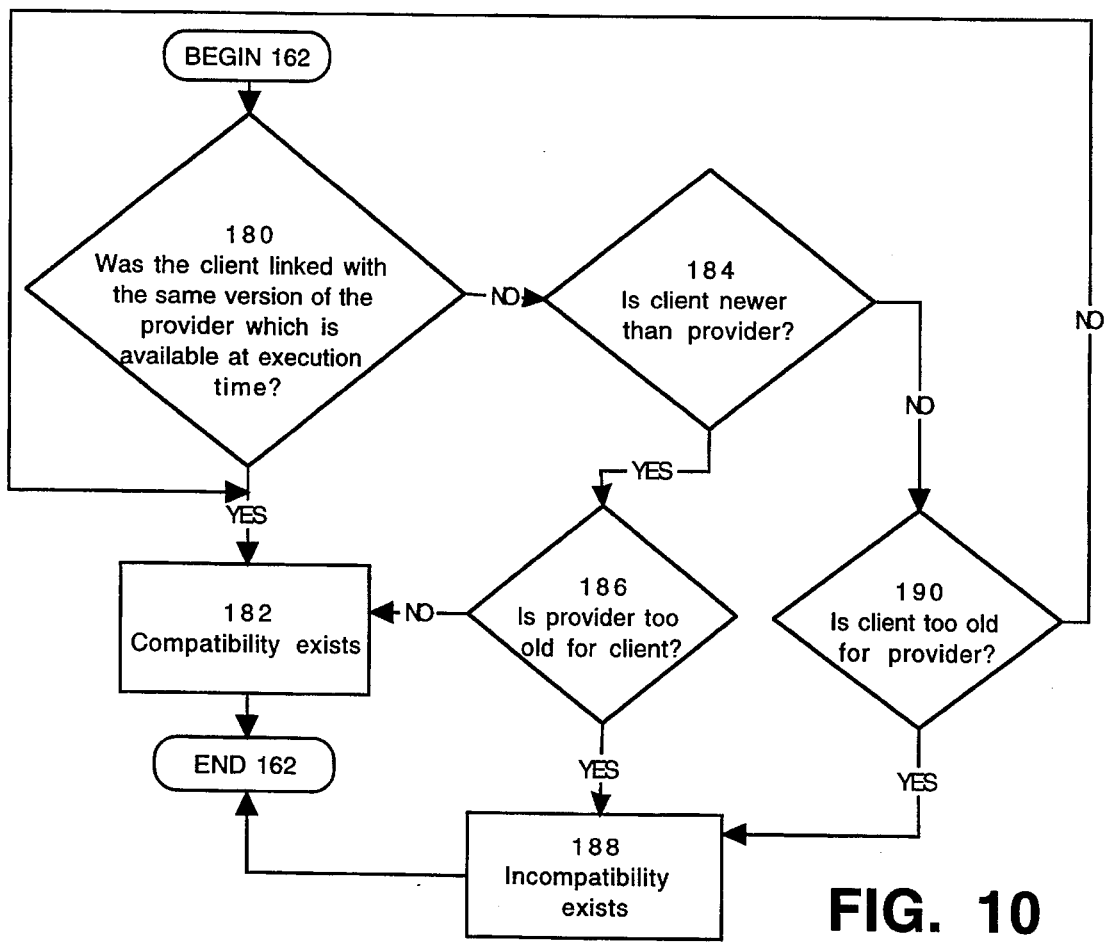
FIG. 10 is a detailed flow chart depicting steps of block 162 of FIG. 9.

At block 162, compatibility is determined by comparing values supplied by the client with values supplied by the implementation provider. FIG. 10 is a flowchart which generally describes the comparisons performed at block 162. At decision block 180, if the version of the provider linked with the client is the same version of the provider which is available at execution, then at block 182, it is determined that compatibility exists. Otherwise, at decision block 184, if the version of the provider specified by values stored in the client, in other words the definition provider, is newer than the implementation provider, then if at decision block 186 the implementation provider is too old for the client, incompatibility is exists at block 188, otherwise compatibility exists at block 182. If at block 184, the implementation provider is newer than the definition provider, then at decision block 190 if the client is too old for the implementation provider, then at block 188 incompatibility exists, otherwise at block 182 compatibility exists.

Figure 11:
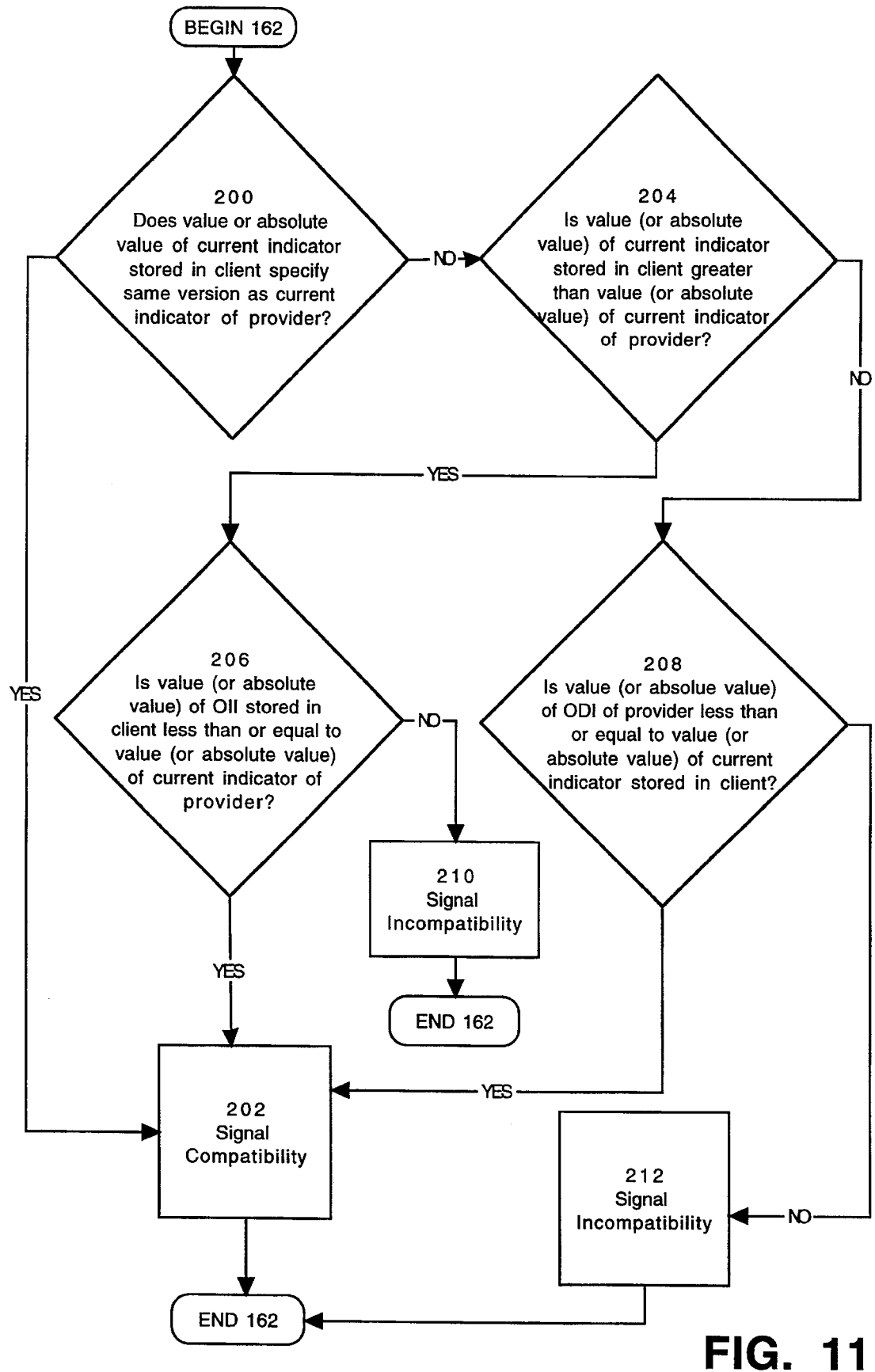
FIG. 11 is a more detailed flow chart of steps performed at block 162 of FIG. 9.

FIG. 11 is a more detailed flowchart of steps performed at block 162 of FIG. 9. At decision block 200 if the current indicator of the client specifies the same version as the current indicator of the implementation provider, then at block 202, it is determined that compatibility exists. Otherwise, if at decision block 204 a value (or absolute value) of the client's current indicator 76 is greater than a value (or absolute value, if compared to the absolute value of the client) of the implementation provider's current indicator 70, then a further comparison is performed at block 206. Otherwise, further comparison is performed at block 208. If at decision block 206, the value (or absolute value) of the OII 78 of the client is less than or equal to the value (or absolute value, if compared to the absolute value of the client's OII) of the current indicator 70 of the implementation provider, then at block 202 compatibility exists. Otherwise, at block 210 compatibility does not exist.

At block 208 if the value (or absolute value) of the ODI 84 of the implementation provider is less than or equal to the value (or absolute value, if being compared to the absolute value of the provider's ODI) of the current indicator 76 of the client, then at block 202 compatibility exists. Otherwise, at block 212 compatibility does not exist.

In the situation where the provider is a shared library, the comparisons at block 206 and 208 essentially check whether the implementation library and definitions provided by a library at link time are compatible. At block 206, a check is performed to determine whether the version of the implementation library is no older than the oldest version of the library with which the client can operate. If so, then the implementation library presumably has an implementation which is compatible with the definitions provided by the version of the provider being used to build the client. At block 208, a check is performed to determine whether the version of the provider used at link time supplied definitions to the client which are compatible with the implementation of the implementation provider. The two are compatible when the version of the provider used at link time is no older than the oldest version of the provider which has definitions which are compatible with the implementation of the implementation provider.

The invention provides a versioning system which permits a developer of a provider to freely assign a new version number to a release of a provider without necessarily rendering it incompatible with clients that were linked with prior versions of that provider. When a new version of a provider is incompatible with a prior version the provider, the ODI and/or OII in the new version is set accordingly, i.e. to indicate the earliest version of the provider which is compatible with the new version of the provider.

The invention also provides a versioning system which does not encourage clients to link with the oldest available version of a provider to increase the number of versions of the provider with which it is compatible. A client can link with a newer version of a provider which is available and benefit from the advantages and features in that version which may not be available in earlier versions and still be able to execute with earlier compatible versions of the provider. For example, consider the situation where two versions of a provider are available at link time, an earlier version having a version number of 1.0 and a later version having a version number of 2.0. The 1.0 and 2.0 versions are compatible and version 2.0 has several advantageous features or enhancements which are not present in version 1.0. The OII in the 2.0 version specifies version 1.0, indicating that a client linked with the 2.0 version can run with the 1.0 version. The client may also change the version indicated by the OII to specify a version earlier to 1.0 if the client verifies that its use of the earlier version is compatible with versions 1.0 and later. At runtime, the client will be able to execute as long as a version of the provider which is no older than the version specified by the OII stored in the client is available and the ODI of the available version specifies a version less than or equal to 2.0. Thus, the invention permits a client to utilize advantages of later versions of a provider available at link time without necessarily decreasing the likelihood of compatibility at runtime.

Figure 12:
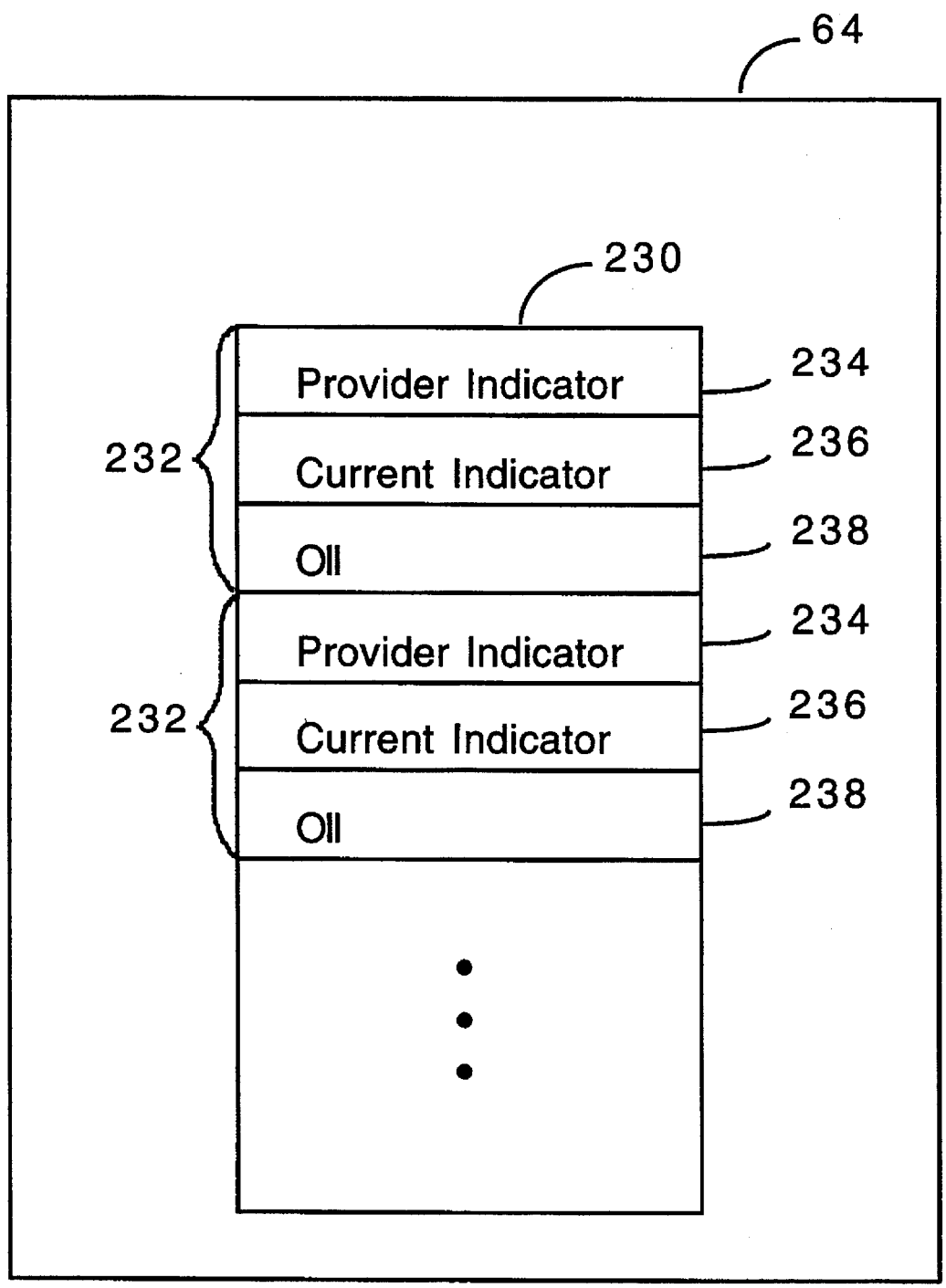
FIG. 12 shows a provider list which is used when a client is linked with multiple types of providers.

As shown in FIG. 12, a client can be linked to multiple types of providers. FIG. 12 illustrates a provider list 230 which is preferably formed when a client is linked with multiple types of providers. For example, a client may be linked with different kinds of shared libraries, a shared library A, a shared library B and a shared library C. In that case, provider list 230 is formed and stored in the client. The provider list 230 can be any list data structure, i.e. array, linked list, which can be searched for a particular item.

The provider list 230 contains one or more provider fields 232, one field per provider that is linked with the client. Each field 232 has a provider indicator 234, a current indicator 236, and an OII 238. A provider indicator 234 uniquely identifies a provider and allows the locating of a provider at runtime. Provider indicator 234 is the same as the provider indicator 68 and 74, previously described. Current indicator 236 and OII 238 correspond to current indicator 70 and OII 72(FIG. 4A), respectively, and their values are derived therefrom.

Figure 13:
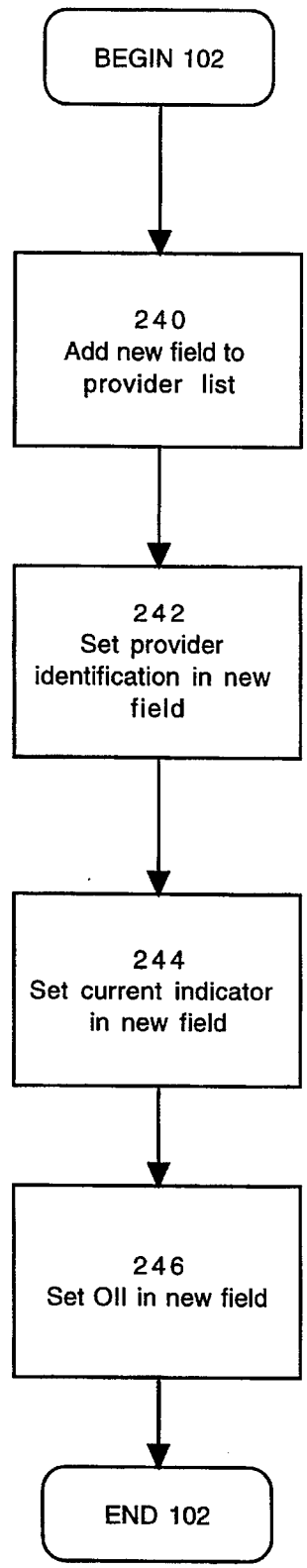
FIG. 13 is a flowchart of steps of block 102 of FIG. 6 when a client is linked with multiple types of providers.

The general steps provided in FIG. 6 still apply when a client is linked with multiple providers, however, some of the details change, as shown in FIG. 13. FIG. 13 is a flowchart of steps of block 102 of FIG. 6 used in this situation. For each type of provider, information about the version of the provider and the compatibility ranges of the provider are stored in a field 232 in the provider list 230.

At block 240, a new field 232 is added to the provider list 230. At block 242, the provider indicator 234 in the new field 232 is set to a unique identification for that provider being linked. At block 244, the current indicator 236 in the new field 232 is set to the value indicated by the current indicator 70 of the provider being linked (FIG. 4A). At block 246, the OII 238 in the new field 232 is set to the value indicated by the OII 72 of the provider being linked. Blocks 242, 244 and 246 can be performed in any order.

Compatibility between the client and a provider is determined in substantially the same way as in FIGS. 9–11, except that the field 232 corresponding to the provider is first located in the provider list 230 and any reference in FIGS. 9–11 to the current indicator stored in the client and to the OII stored in the client is actually a reference to those values in the located field. The provider indicator stored in the client references the provider from which the current indicator and ODI of the provider are obtained.

Figure 14:
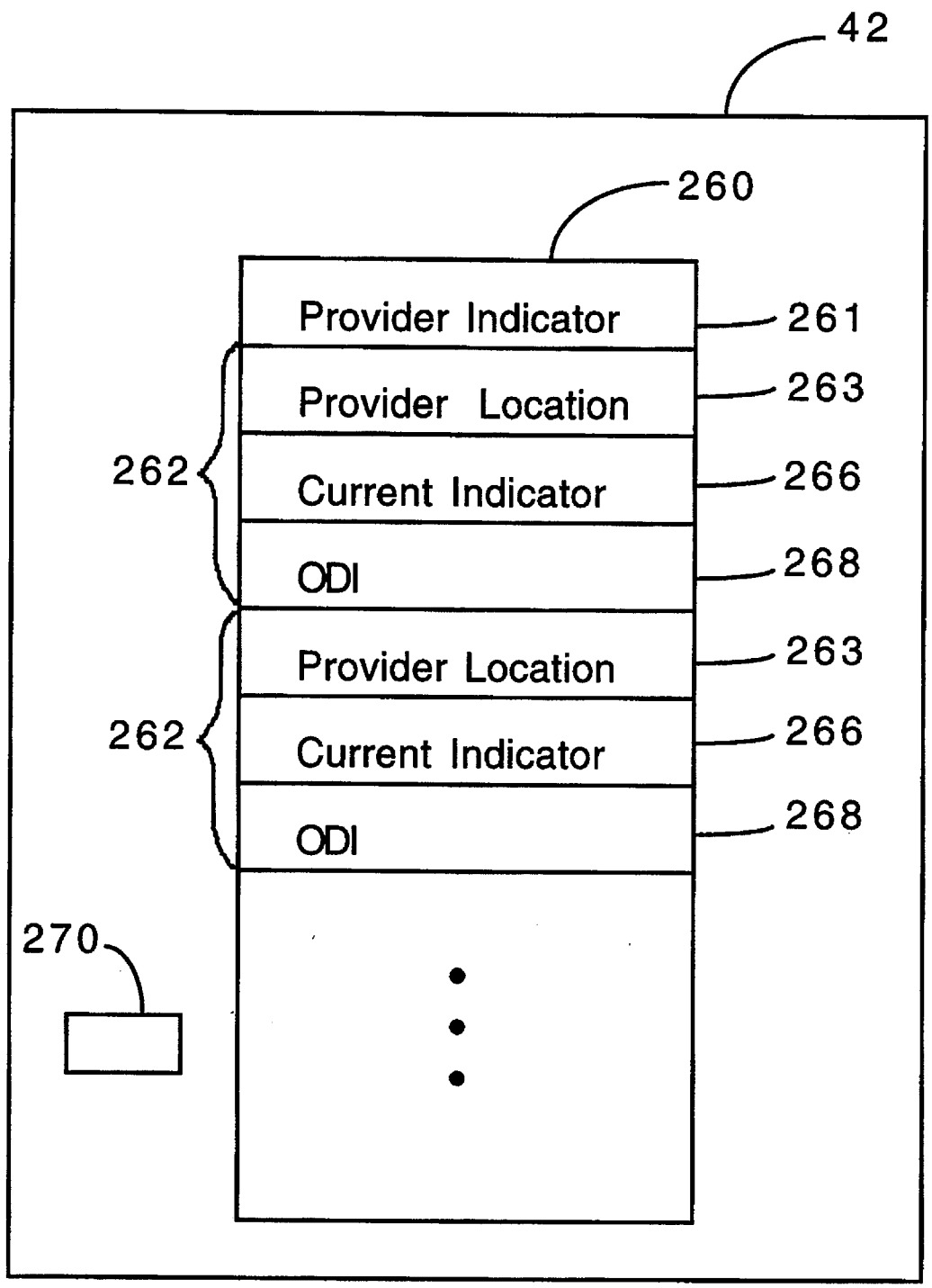
FIG. 14 shows an implementation provider list which is used when multiple versions of a provider are available at execution of a client.

Preferably, when more than one implementation version of a provider is available at runtime of the client, the invention provides for determining the "best" compatible version to use. In this case, an implementation provider list 260, as shown in FIG. 14, can be formed, preferably by the connector 36, at runtime. Implementation provider list 260 has a provider indicator 261 similar to the provider indicator 234 and one or more provider fields 262, preferably one for each available version of an implementation provider. Each provider field 262 has a provider location 263, a current indicator 266, similar to current indicator 236, and an ODI 268. The provider location 263 specifies a physical location, while the current indicator and the ODI are derived from the current indicator 70 and the ODI 84, respectively, of the provider (FIG. 5).

The implementation provider list 260 is searched for versions of the implementation provider which are compatible with the client and, preferably, the "best" compatible version is selected. Compatibility is determined according to the steps described with FIG. 15. Numerous kinds of criteria can be used to determine the "best" compatible version. For example, the "best" version may be the most recent version which is compatible with the client or it may be the version which is closest to the version specified to the version of the provider which was used at link time. In other words, the indicator value of the provider specifies a version numerically closest to the version specified by the indicator value of the client.

Preferably, a compatibility indicator 270 (FIG. 14) is maintained during the search. At any point during the search, the compatibility indicator specifies the version, if any, or the field 262, within the implementation provider list 260 specifying that version which is the "best" of the versions identified by the fields searched. The compatibility indicator 270 may be, for example, a pointer into the provider list or it may be a data structure having the same structure and information as a field 262 in the implementation provider list 260.

Figure 15:
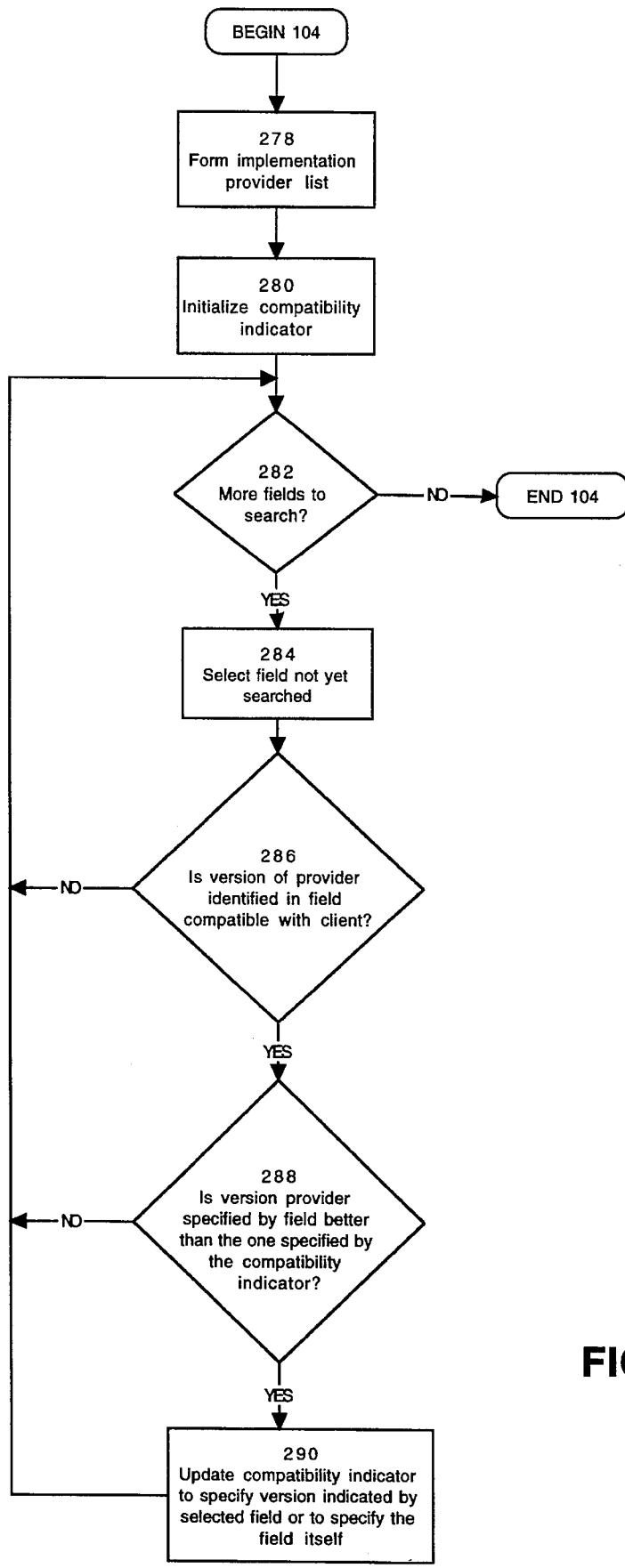
FIG. 15 is a flowchart depicting preferable steps for determining compatibility at block 104 of FIG. 6 when multiple versions of a provider are available at execution of a client.

FIG. 15 shows the steps performed at block 104 of FIG. 6 when more than one version of an implementation provider is available at runtime of a client. At block 278, an implementation provider list is formed. The logical name of each provider is retrieved from the client and memory and the disk are searched to locate each provider. At block 280, the compatibility indicator 270 is initialized.

At block 282, if there are one or more unsearched fields 262 in the implementation provider list 260, then at block 284 an unsearched field is selected as the current field being examined. Otherwise, the search ends and control returns to block 106 of FIG. 6, indicating whether compatibility exists and, if so, which version should be used.

At decision block 286, compatibility between the client and the version of a provider specified by the provider location 263 of the current field is determined according to the steps of FIGS. 10 and 11. If compatibility is found then at block 288 it is determined whether the version specified in the current field is "better" than the version specified by the compatibility indicator. If compatibility is not found at block 286, then control returns to block 282.

If at block 288, the current field's version is the "better" version, then the compatibility indicator is updated to specify the current field or the version indicated by the current field. In either case, control then returns to block 282.

By providing a mechanism for determining compatibility between a client and a multiple of available implementation providers the invention provides several advantages. First, a finding of incompatibility between available versions of a provider will not prevent a client from executing as long as at least one compatible version is found. Second, by searching through a list of available versions of a provider, the invention provides a mechanism for finding a "best" or most suitable version. Depending on the criteria used to determine which version is best, this may allow clients to benefit from advantages of later versions of a provider which they might not otherwise have been able to access. Third, the invention allows more clients to execute because it provides more choices of providers than prior versioning schemes. Older clients can execute with newer providers and newer clients can execute with older providers. Fourth, the invention allows a version of a provider to be incompatible with past providers, i.e. backward compatibility is not required. Thus the invention provides more flexibility than prior versioning schemes because a provider can choose whether to be backward or frontward compatible, both or neither.

The attached appendix contains a Macintosh Programmer's Workshop ("MPW") text file which contains source code implementing the invention on a Macintosh computer having a mechanism such as a software manager for connecting together client and provider programs. MPW is a registered trademark of Apple Computer, Inc.

Figure 16:
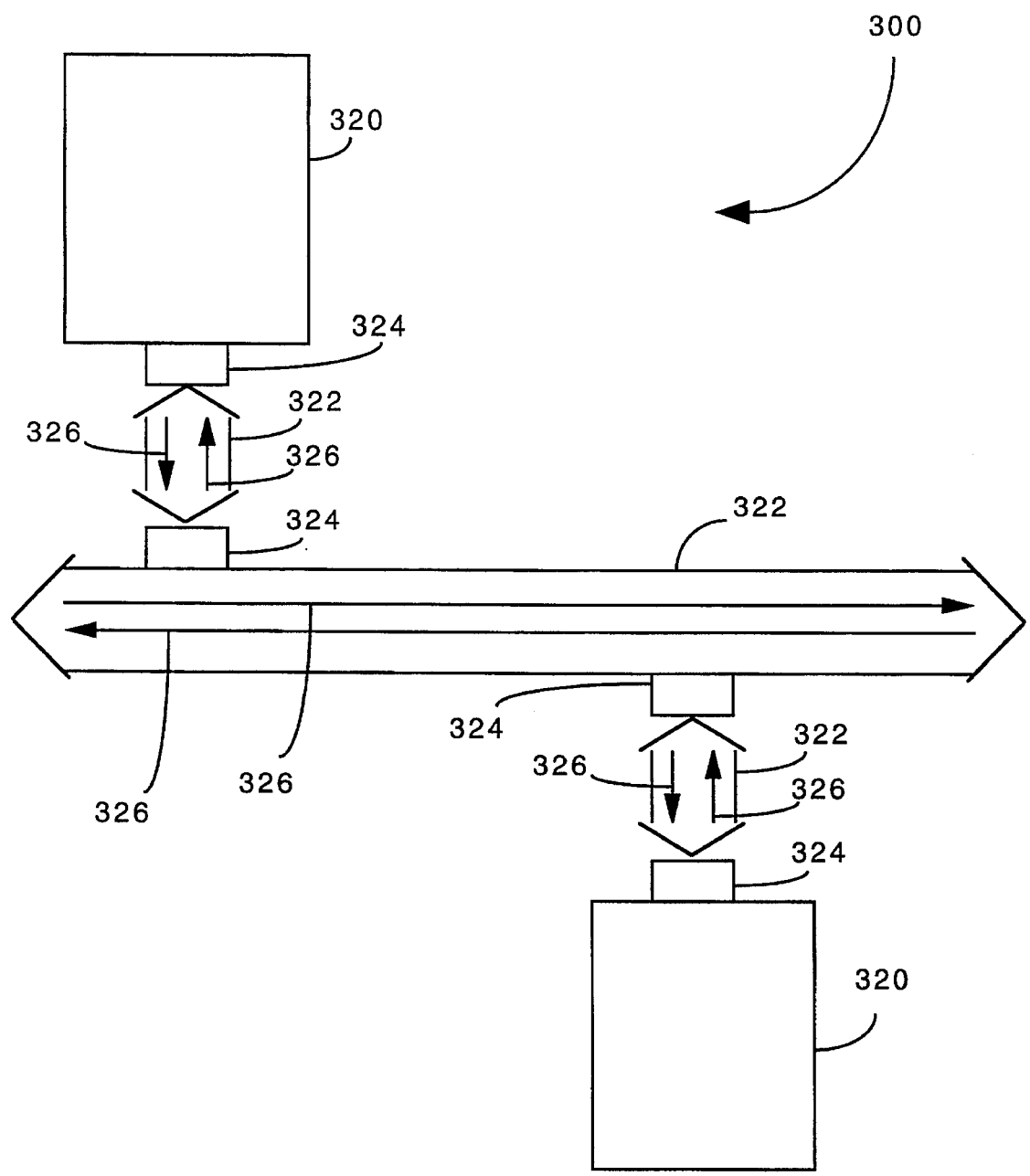
FIG. 16 is a simplified block diagram of a primarily hardware type system of FIG. 1 incorporating the invention.

FIG. 16 illustrates an example of hardware which can incorporate the invention. Numeral 300 refers generally to a system for connecting external devices to a bus. Common examples of such systems include Small Computer Standard Interface ("SCSI") and Apple Desktop Bus ("ADB") both of which involve standards for connecting compliant devices 320 via a specified set of cables 322 and connectors 324 and exchanging a specified set of electrical signals over the cable. Apple Desktop Bus is a trademark of Apple Computer, Inc. The cable typically includes one or more wires 326A dedicated to carrying data values and one or more wires 326B dedicated to carrying control signals. Typically, there is a fixed interface or dedicated wires to indicate versioning of devices. For example, later versions of devices often add control wires that are left "floating", i.e. unconnected, by earlier devices. These added control wires are set to a defined voltage by new devices. Thus, two devices can detect the version of a standard supported by the other, given a pair of wires, one in each direction. Or the standard may have specified rules for the connection of a specific pair of devices in a specific direction, allowing for the use of a single "version" wire. The device in control of a wire signals its version to the other device. The other device then determines whether compatibility exists.

Figure 17:
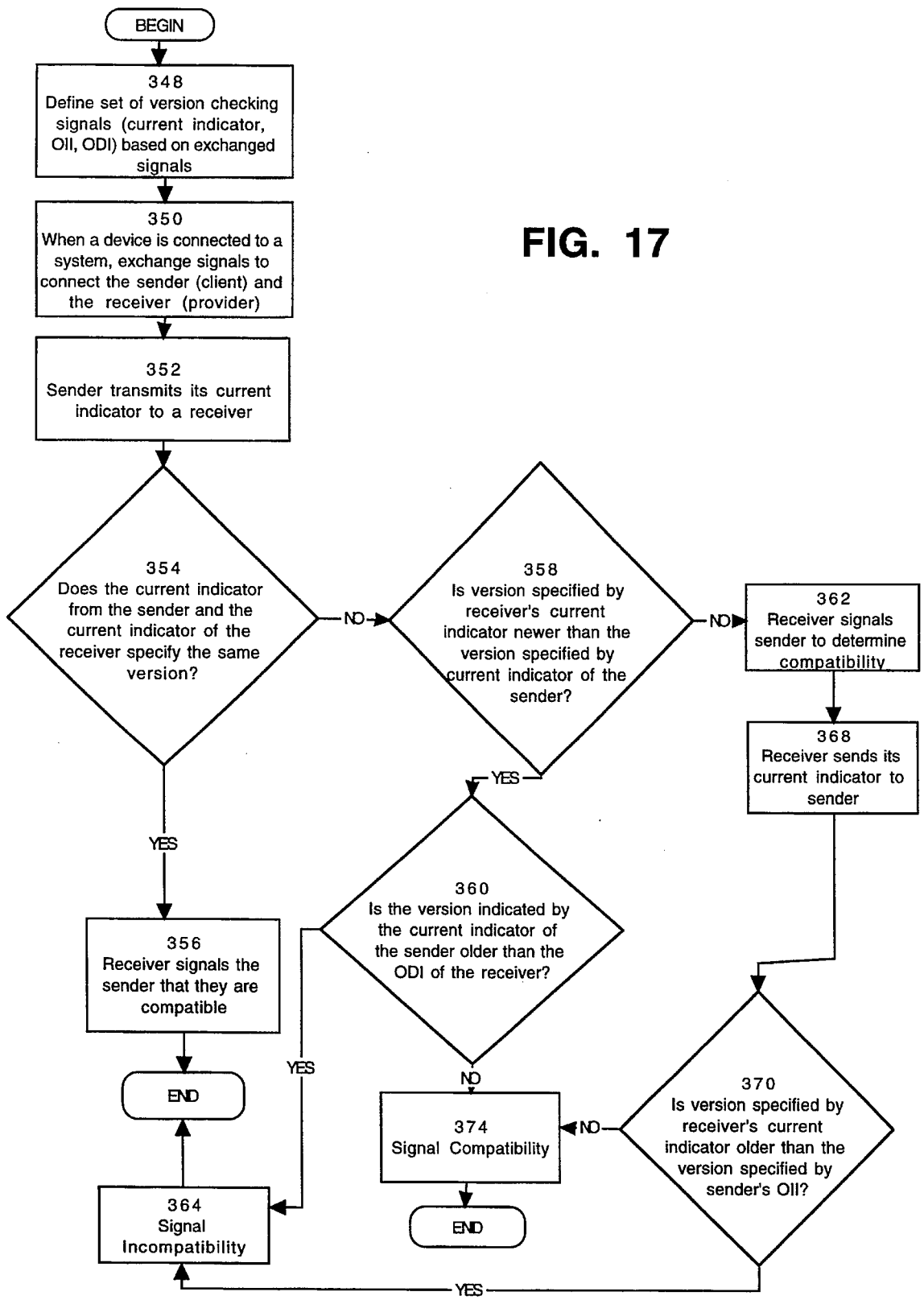
FIG. 17 is a flowchart generally depicting steps of the invention in a system of FIG. 16.

FIG. 17 is a flowchart describing steps of the invention incorporated into a system shown in FIG. 16 wherein devices may be identified as a "sender" (client) or a "receiver" (provider). At block 348, a current indicator and an oldest implementation indicator, analogous to those previously described, are built into a sender and a current indicator and an oldest definition indicator, analogous to those previously described, are built into a receiver. These version checking signals can be defined externally by the standard of the hardware. As shown at block 350 when a device is connected to the system, signals are exchanged to connect a sender and a receiver. At block 352, a sender transmits its current indicator to a receiver.

If at block 354, the current indicator from the sender and the current indicator of the receiver specify the same version, then the receiver signals the sender that they are compatible at block 356. Otherwise, if at block 358 the current indicator of the receiver specifies a version which is newer than the version specified by the current indicator from the sender, then control is passed to block 360, otherwise control is passed to block 362.

At block 360, if the version specified by the current indicator from the sender is older than the oldest definition indicator of the receiver, then at block 364, the receiver signals incompatibility to the sender. Otherwise, at block 374, the receiver signals compatibility to the sender.

At block 362, the receiver signals the sender that the sender should determine compatibility and at block 368 the receiver sends its current indicator to the sender. At block 370, if the version specified by the current indicator from the receiver is older than the version specified by the oldest implementation indicator of the sender, then the sender signals incompatibility to the receiver at block 364. Otherwise, at block 374, the sender signals compatibility to the receiver.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

P1036
PATENTS

APPENDIX

```
typedef TUnsigned32  TVersion;      /* Version number */
    /* The inner structure is undefined but comparisons for equality and */
    /* magnitude as an unsigned integer must be meaningful.              */ typedef struct ObjectDef {
  struct ObjectDef *hashNext;
  struct ObjectDef *hashPrev;
  long hashword;
  FSSpecPtr  fileSpec;         // ptr to fileSpec that holds name ObjectIdent objID;

Boolean updateCheck;         // have we searched for update libs for this object yet?
  Boolean hadVersionErr;       // are version number valid?
  short  dummy2;

TVersion  currentVersion;
  TVersion  oldImplVersion;
  TVersion  oldDefVersion;

OSType loaderType;           // not used; just passed thru to debugger api
  TCFLProcsPtr    theProcs;
  TCFLPrivateInfoPtr containerInfo;   // used to perform GetExportInfo on partially closed containers Boolean preLoaded;           // the object was pre-loaded (allows un-pre-loading)
  Boolean shareable;           // the object is shared if any (writeable) section in the object is shareable
  Boolean sharenever;          // the object is not to be reconnected to when dynamically (covertly)
attached
  Boolean mappedShared;        // if the object is mapped in the shared region Ptr  objectMapping;          // if mapped
```

P1036
PATENTS

```
    MapID mapID;            // if mapped long connRefCount;
    long sectionCount;

Boolean *initBefore;       // array of initBefore flags for this object
    long importedSymCount;     // number of imported symbols
    long exportedSymbolCount;
    long importedObjectCount;

long extra [3];            // free sofar struct ObjectDefExtension *objectDefExtension;

Section sections [ kDefNumSections ];      // dynamically sized when allocated
} ObjectDef;

typedef struct ObjectIdent {
    Boolean     oKind;      // exact container or search by name
    Boolean     appHeap;
    Boolean     dummy1;
    Boolean     useVerChk;

TVersion    oldImplVersion;
    TVersion    linkedVersion;
    OSType      architecture;
    long        updateLevel;
    long        ioFlMdDat;   // container:disk
    unsigned char *pNamePtr;  // hashed name of library - file or memory address
    unsigned char *dNamePtr;  // imported name of library
    FragmentLocator fragLocator;

long        extra [3];
```

34

P1036
PATENTS

```
} ObjectIdent;

FragErr CheckVersion ( ObjectDef *provider, ObjectIdent *client )
{

// Zero is a special "match anything" case.
   if (provider->currentVersion == 0) return fragNoErr;
   if (client->linkedVersion == 0) return fragNoErr;

// Check the client/provider relationship
   if (provider->currentVersion == client->linkedVersion) {
      return fragNoErr;
   } else if (provider->currentVersion > client->linkedVersion) {
      // The provider is newer than the client's expectation
      if (provider->oldDefVersion > client->linkedVersion)
         return fragImportTooNew; // The provider is too new.
   } else {
      // The provider is older than the client's expectation
      if (provider->currentVersion < client->oldImplVersion )
         return fragImportTooOld; // The provider is too old.
   };

return fragNoErr;
} /* CheckVersion () */
```

35

I claim:

1. A method for verifying compatibility between modular components in a system having a processor, at least one client component and at least one provider component, the at least one provider component capable of providing services to the at least one client component, a provider component having one or more versions, the at least one client being linked to a version of a provider component during the creation of an executable file of the at least one client and the at least one client, during execution on the processor, using a version of the provider component which is available in the system at the time of execution, wherein the provider component used during execution may be a different version than the provider component to which the client was linked, said method comprising the steps of:

specifying a provider indicator for each provider component, said provider indicator identifying a provider component's type and uniquely identifying the provider component in a manner that distinguishes the provider component from other provider components;

specifying a current indicator for each version of each provider component, said current indicator having a value identifying a version of the provider component in a manner which distinguishes the version from other versions of the provider component;

specifying for each version of each provider component a compatibility range, the compatibility range for a version of a provider component identifying a range of versions of the provider component which are compatible with that version of the provider component such that during execution of a client that version of the provider can be used as long as the client was built using a version of the provider component identified in that version's compatibility range;

specifying for each client component a compatibility range for each provider component to which it is linked, each compatibility range identifying a range of versions of a provider component which can be used to execute the client component;

linking the at least one client to a provider component to construct an executable client component;

associating the at least one client with the current indicator of the linked provider component;

when a client component is executed, determining which of the at least one provider component and versions thereof are available on the system and connecting the client component and the available at least one provider component such that information such as the current indicator and compatibility range of the provider component, the current indicator of a provider component associated with the client component during linking, and the compatibility range of the client can be exchanged between the connected client component and the available at least one provider component;

determining compatibility between the client component and the connected at least one provider component, the determination being based on the current indicator of the at least one provider component, the current indicator of a provider component associated with the client component during linking, and the compatibility range of the newer of the at least one provider component and the client component such that compatibility is found to exist when the current indicator of the at least one provider component and the current indicator of the linked provider component indicate substantially the same version of the provider component or when the current indicator of the older of the at least one provider component and the linked provider component is within the compatibility range of the newer of the at least one provider component and the client component; and indicating whether compatibility exists.

2. A method defined in claim 1 wherein the steps of determining compatibility and indicating whether compatibility exists includes the steps of:

comparing the value of the current indicator of the connected provider component to the value of the current indicator associated with the client component during linking and if the two values indicate substantially the same versions, then indicating compatibility, and if the two versions are not substantially the same, then if the value of the current indicator associated with the client component indicates a version which is newer than the version indicated by the value of the current indicator of the provider component, then if the version specified by the value of the current indicator of the provider component is within the compatibility range of the client component, then indicating compatibility, otherwise indicating incompatibility, and if the value of the current indicator of the provider component indicates a version which is newer than the version indicated by the value of the current indicator stored in the client component, then if the version specified by the value of the current indicator associated with the client component is within the compatibility range of the connected provider component, indicating compatibility, otherwise indicating incompatibility.

3. A method as defined in claim 2 wherein the current indicator of a version of a provider component is defined such that its value is greater than or equal to the values of current indicators of prior versions of that provider component and a version indicated by a value of a first current indicator is newer than a version indicated by a value of a second current indicator when the value of the first current indicator is greater than the value of the second current indicator.

4. A method as defined in claim 1 wherein the compatibility range specified for a particular version of a provider component indicates an oldest version of the provider component capable of building a client component which which can be used to execute the particular version of the provider.

5. A method as defined in claim 1 wherein the compatibility range specified for a particular client component which is linked to a particular provider component indicates an oldest version of the particular provider component which can be used to execute the particular client component.

6. A method for verifying compatibility between modular components in a system having a processor, at least one client component and at least one provider component, a provider component having one or more versions, the at least one provider component capable of providing services to the at least one client component, the at least one client being linked to a version of a provider component during the creation of an executable file of the at least one client and the at least one client, during execution on the processor, using a version of the provider component which is available in the system at the time of execution, wherein the provider component used during execution may be a different version than the provider component to which the client was linked, the linked provider component supplying definitions of an application interface to the client component, said provider component capable of supplying definitions, implementation or both, said method comprising the steps of:

specifying a provider indicator for each provider component, said provider indicator identifying a provider component's type and uniquely identifying the provider component in a manner that distinguishes the provider component from other provider components;

specifying a current indicator for each version of a provider component, said current indicator having a value identifying a version of the provider component in a manner which distinguishes the version from other versions of the provider component;

specifying for each version of a provider component an oldest implementation indicator, the oldest implementation indicator indicating an oldest version of that provider component having an implementation which is compatible with definitions supplied by the each version of the provider component;

specifying for each version of a provider an oldest definition indicator, the oldest definition indicator indicating an oldest version of that provider component which supplies definitions that are compatible with the implementation of the each version of the provider component;

when a client component is being linked with a version of a provider component, associating with the client component the provider indicator, the current indicator and the oldest implementation indicator of that version of the provider component being linked;

when a client component is executed, determining which of the at least one provider component and versions thereof are available on the system and connecting the client component and the available at least one provider component such that information such as the provider indicator, the current indicator of the connected provider component, the current indicator of a provider component associated with the client component during linking, oldest implementation indicator and oldest definition indicator can be exchanged between the connected client component and the available at least one provider component;

determining compatibility between the client component and the connected at least one provider component, the determination being based on the values of the provider indicator, the current indicator of the connected provider component, the current indicator of a provider component associated with the client component during linking, the oldest implementation indicator and the oldest definition indicator, the determination further being based on the newer of the versions indicated by the current indicator of the connected provider component and the current indicator of the associated provider component; and indicating whether compatibility exists.

7. A method defined in claim 6 wherein the steps of determining compatibility and indicating whether compatibility exists includes the steps of:

comparing the value of the current indicator of the connected provider component to the value of the current associated with the client component and if the two values indicate substantially the same version, then indicating compatibility, and if the two versions are not substantially the same, then if the value of the current indicator associated with the client indicates a version which is more recent than the version indicated by the value of the current indicator of the connected provider component, then if the oldest implementation indicator associated with the client component specifies a version which is older or the same as the version indicated by the value of the current indicator of the provider, then indicating compatibility, otherwise indicating incompatibility, and if the value of the current indicator of the provider component indicates a version which is more recent than the version indicated by the value of the current indicator associated with the client component, then if the version specified by the value of the oldest implementation indicator of the provider component is older than or the same as the version indicated by the value of the current indicator associated the client, then indicating compatibility, otherwise indicating incompatibility.

8. A method defined in claim 6 wherein the steps of determining compatibility and indicating whether compatibility exists includes the steps of:

comparing the value of the current indicator of the connected provider component to the value of the current indicator associated with the client and if the two values indicate substantially the same version, then indicating compatibility, and if the two versions are not substantially the same, then if the absolute value of the value of the current indicator associated with the client component is greater than the absolute value of the value of the current indicator of the connected provider component, then if the absolute value of the value specified by the oldest implementation indicator associated with the client component is less than or equal to the absolute value of the value of the current indicator of the provider component, then indicating compatibility, otherwise indicating incompatibility, and if the absolute value of the value of the current indicator of the provider component is greater than the absolute value of the value of the current indicator associated with the client, then if the absolute value of the value specified by the oldest definition implementation of the provider component is less than or equal to the absolute value of the value of the current indicator associated with the client component, then indicating compatibility, otherwise indicating incompatibility.

9. A method defined in claim 6 wherein the steps of determining compatibility and indicating whether compatibility exists includes the steps of:

forming a list of available versions of one or more provider components, the list having an element for each version of a provider component, each element specifying the provider indicator, the current indicator and the oldest definition implementation for the version of the provider component specified by the element;

initializing a compatibility indicator which specifies a best compatible version, if any exists, among the versions specified by version indicators in elements in the list;

searching fields of the list for a best compatible version of the provider component by determining for each element compatibility between a version of the provider component specified by the current indicator of that element and the client component and, if compatible, comparing the version specified by the current indicator of the element to a version specified by the compatibility indicator to determine which is better and if the version specified by the version indicator of the element is better, then setting the compatibility indicator to indicate the version specified by the current indicator; and indicating whether a compatible version is found and, if so, indicating which version is the best compatible version.

10. A method defined in claim 9 wherein compatibility between the version specified by the current indicator of the element and the version specified by the current indicator associated with the client component is determined and indicated by comparing the version specified by the current indicator of the element and the version specified by the current indicator associated with the client and if the two versions are substantially the same, then indicating compatibility, and if the two versions are not substantially the same and if the value of the current indicator associated with the client component specifies a version which is newer than the version specified by the value of the current indicator of the element then if the oldest implementation indicator associated with the client component specifies a version which is older than or the same as the version specified by the current indicator of the element, then indicating compatibility, otherwise indicating incompatibility, and if the version specified by the value of the current indicator of the element is newer than the version specified by the value of the current indicator associated with the client component, then if the version specified by the oldest definition indicator of the provider component is older than or the same as the current indicator associated with the client component, then indicating compatibility, otherwise indicating incompatibility.

11. A method defined in claim 9 wherein a first version of a provider component is better than a second version of a provider component if the first version is newer than the second version.

12. A method defined in claim 9 wherein a first version is newer than a second version if a first value specifying the first version is greater than a second value specifying the second version.

13. A method defined in claim 9 wherein a best compatible version is the compatible version specified by a value which is numerically closest to the value specified by the current indicator associated with the client component and if two compatible versions have substantially the same numerical closeness to the value specified by the current indicator associated with the client component and those two compatible versions are the numerically closest to the value specified by the current indicator associated with the client component, then the newer of the two versions is the best compatible version.

14. A method defined in claim 9 wherein a best compatible version is the compatible version which is numerically closest to the value specified by the current indicator associated with the client component and which is more recent or equal in age to the version specified by the value of the current indicator associated with the client.

15. An apparatus for verifying compatibility between components in a system having a processor, at least one client component and at least one provider component which supplies definitions of an application interface to the client component, said apparatus comprising:

a memory;

a disk drive;

one or more client components stored on said disk drive;

one or more provider components, each provider component being stored on said disk drive, each of said provider components having one or more versions;

a linker for linking a client component to one or more provider components to create an executable file of the at least one client, said linker stored on said disk drive;

a processor capable of loading into memory and executing a linker, one or more client components and one or more provider components;

means for specifying a provider indicator for each provider component, said provider indicator identifying a provider component's type and uniquely identifying the provider component in a manner which distinguishes the provider component from other provider components, said provider indicator being associated with a client component when the client component is linked to the provider component;

means for specifying a current indicator for each version of each provider, said current indicator having a value identifying a version of the provider component in a manner which distinguishes the version from other versions of the provider component, said current indicator being associated with a client component when the client component is linked to the provider component;

means for specifying a compatibility range for each version of each provider component and for each client component linked with that provider component, said compatibility range being associated with a client component when the client component is linked to the provider component;

a connector for determining at execution of a client component available provider components and for connecting a client component to one or more available provider components such that information such as the provider indicator, current indicator and compatibility ranges can be exchanged between the connected client component and the available at least one provider component;

means for determining compatibility based on the values of the current indicator of the connected provider component, the current indicator associated with the client component and the compatibility ranges of the provider and client components, compatibility existing when the current indicator of the associated provider component and the current indicator of the connected provider component indicate substantially the same version or when the older of the versions specified by the current indicator of the associated provider component and the current indicator of the connected provider component is within the compatibility range of the newer of said versions; and means for indicating compatibility.

16. A method for defining compatibility between components in a system having a processor, at least one client component and at least one provider component, a provider component having one or more versions, the at least one provider component capable of providing services to the at least one client component, said method comprising the steps of:

specifying a provider indicator for each provider component, said provider indicator identifying a provider component's type and uniquely identifying the provider component in a manner that allows the provider component to be distinguished from other provider components;

specifying a current indicator for each version of each provider, said current indicator having a value identifying a version of the provider component in a manner which distinguishes it from other versions of the provider component; and specifying compatibility ranges for each version of each provider component, a compatibility range for a particular version identifying a range of versions of the provider component which are compatible and interoperable with the particular version, wherein said current indicator and compatibility ranges are defined such that compatibility exists between a first and second version of a provider component, said first version of the provider component being linked to the client component and said second version of the provider component being available at execution of the client component on a processor when (A) the current indicator of the first version of the provider component and the current indicator of the second version of the provider indicate substantially the same version of the provider component, or when (B) the current indicator of the second version of the provider component indicates a newer version than the current indicator of the first version of the provider component and the first version of the provider component is within the compatibility range of the second version of the provider component, or when (C) the current indicator of the first version of the provider component indicates a newer version than the current indicator of the second version of the provider component and the second version of the provider component is within the compatibility range of the first version of the provider component.

17. A method for defining compatibility between components in a system having at least one client component and at least one provider component, each provider component having one or more versions, said client component being linked to a version of a provider component which supplies definitions of an application interface to the client component and executing with a version of a provider component which may be the same or different than the version of the provider component that supplied the definitions to the client component during linking, said method comprising the steps of:

specifying a provider indicator for each provider component, said provider indicator identifying a provider component's type and uniquely identifying the provider component in a manner that allows the provider component to be distinguished from other provider components;

specifying a current indicator for each version of each provider, said current indicator having a value identifying a version of the provider component in a manner which distinguishes it from other versions of the provider component;

specifying an oldest implementation indicator for each version of each provider, the oldest implementation indicator indicating an oldest version of that provider component having an implementation which is compatible with definitions supplied by the each version of the provider component; and specifying for each version of a provider an oldest definition indicator, the oldest definition indicator indicating an oldest version of that provider component which supplies definitions that are compatible with the implementation of the each version of the provider component, wherein said current indicator and compatibility ranges are defined such that compatibility exists between a first and second version of a provider component, said first version of the provider component being linked to the client component and said second version of the provider component being available at execution of the client component on a processor when (A) the current indicator of the first version of the provider component and the current indicator of the second version of the provider indicate substantially the same version of the provider component, or when (B) the current indicator of the second version of the provider component indicates a newer version than the current indicator of the first version of the provider component and the current indicator of the first provider component indicates a version that is no older than the version specified by the oldest definition indicator of the second version of the provider component or when (C) the current indicator of the first version of the provider component indicates a newer version than the current indicator of the second version of the provider component and the current indicator of the second version of the provider component indicates a version that is no older than the version specified by the oldest implementation indicator of the first version of the provider component.

18. A method as defined in claim 17, said method further comprising the steps of:

linking a client component with a version of a provider component; and associating with the client program the provider indicator, current indicator and oldest implementation indicator of the version of the provider being linked with the client component.

19. An apparatus for verifying compatibility between components in a system having a processor, at least one client component and at least one provider component which supplies definitions of an application interface to the client component, the at least one provider component capable of providing services to the at least one client component, said apparatus comprising:

a first computer system having a processor and a storage unit;

a second computer system having a processor and a storage unit;

a linker stored in said storage unit of said first computer system for linking a client component to one or more provider components, said linking creating an executable file of said client component;

one or more client components stored in one of said storage units;

one or more provider components, each provider component being stored on said disk drive, each of said provider components having one or more versions;

means for specifying a provider indicator for each provider component, said provider indicator identifying a provider component's type and uniquely identifying the provider component in a manner which distinguishes the provider component from other provider components, said provider indicator being associated with a client component when the client component is linked to the provider component;

means for specifying a current indicator for each version of each provider, said current indicator having a value identifying a version of the provider component in a manner which distinguishes the version from other versions of the provider component, said current indicator being associated with a client component when the client component is linked to the provider component;

means for specifying a compatibility range for each version of each provider component and for each client component linked with that provider component, said compatibility range being associated with a client component when the client component is linked to the provider component;

a connector for determining at execution of a client component available provider components and for connecting a client component to one or more available provider components such that information such as the provider indicator, current indicator and compatibility ranges can be exchanged between said connected client component and said one or more available provider components, said connector being on each of said first and second computer systems such that said client component can be executed on either said first or said second computer system;

means for determining compatibility based on the values of the current indicator of the connected provider component, the current indicator associated with the client component and the compatibility range of the newer of the at least one provider component and the client component such that compatibility is found to exist when the current indicator of the at least one provider component and the current indicator of the linked provider component indicate substantially the same version of the provider component or when the current indicator of the older of the at least one provider component and the linked provider component is within the compatibility range of the newer of the at least one provider component and the linked provider component; and means for indicating compatibility.

* * * * *

UNITED STATES PATENT AND TRADEMARK OFFICE
CERTIFICATE OF CORRECTION

PATENT NO : 5,613,101
DATED : March 18, 1997
INVENTOR(S) : Alan W. Lillich

It is certified that error appears in the above-identified patent and that said Letters Patent is hereby corrected as shown below:

Claim 4, line 4, delete "which which" and insert --which--.

Claim 6, line 9, delete "creation of an executable file of the at least one client and the at least one client," and insert -- "creation of an executable file of the at least one client and the at least one provider component,--.

Claim 7, line 5, delete "value of the current associated" and insert --value of the current indicator associated--.

Claim 16, line 30, delete "component on a processor when (A)" and insert --component on a processor, when (A)--.

Claim 17, line 41, delete "component on a processor when (A)" and insert --component on a processor, when (A)--.

Signed and Sealed this

Sixth Day of April, 1999

Attest:

Q. TODD DICKINSON

*Attesting Officer*   *Acting Commissioner of Patents and Trademarks*